United States Patent [19]

Grant et al.

[11] Patent Number: 4,923,924

[45] Date of Patent: * May 8, 1990

[54] THERMOPLASTIC IMPACT MODIFIED POLYAMIDE-POLYPHENYLENE ETHER COMPOSITION

[75] Inventors: Thomas S. Grant, Vienna; Ronald L. Jalbert, Parkersburg; David Whalen, Parkersburg; Brenda A. Bartges, Parkersburg; Tracey L. Thompson, Vienna, all of W. Va.

[73] Assignee: Borg-Warner Chemicals, Inc., Parkersburg, W. Va.

[ * ] Notice: The portion of the term of this patent subsequent to Jan. 17, 2006 has been disclaimed.

[21] Appl. No.: 171,801

[22] Filed: Mar. 22, 1988

Related U.S. Application Data

[60] Continuation-in-part of Ser. No. 60,600, Jun. 11, 1987, Pat. No. 4,798,865, which is a division of Ser. No. 805,644, Dec. 6, 1985, Pat. No. 4,732,938.

[51] Int. Cl.$^5$ .................... C08L 77/00; C08L 59/00; C08L 53/02
[52] U.S. Cl. ......................... 525/66; 525/68; 525/92; 525/132; 525/179; 525/183; 525/184; 525/391; 525/397
[58] Field of Search ............... 525/66, 68, 291, 397, 525/183, 132, 179, 905, 149, 92, 184

[56] References Cited

U.S. PATENT DOCUMENTS

| | | | |
|---|---|---|---|
| 3,259,520 | 7/1966 | Borman | 428/411.1 |
| 3,668,274 | 6/1972 | Owens et al. | 525/66 |
| 4,097,556 | 6/1978 | Toyama et al. | 525/68 |
| 4,221,879 | 9/1980 | Humme et al. | 525/66 |
| 4,315,086 | 2/1982 | Ueno et al. | 525/391 |
| 4,338,421 | 7/1982 | Maruyama et al. | 525/397 |
| 4,362,846 | 12/1982 | Korber et al. | 525/66 |
| 4,410,651 | 10/1983 | Haaf et al. | 525/132 |
| 4,600,741 | 7/1986 | Aycock et al. | 525/132 |
| 4,642,358 | 2/1987 | Aycock et al. | 549/245 |
| 4,654,405 | 3/1987 | Jalbert et al. | 525/391 |
| 4,659,763 | 4/1987 | Gallucci et al. | 524/358 |
| 4,681,915 | 7/1987 | Bates et al. | 525/140 |
| 4,728,693 | 3/1988 | Droscher et al. | 525/181 |
| 4,732,938 | 3/1988 | Grant et al. | 525/391 |

FOREIGN PATENT DOCUMENTS

| | | |
|---|---|---|
| 222250 | 5/1987 | European Pat. Off. . |
| 232363 | 8/1987 | European Pat. Off. . |
| 234063 | 9/1987 | European Pat. Off. . |
| 236596 | 9/1987 | European Pat. Off. . |
| 244090 | 11/1987 | European Pat. Off. . |
| 250979 | 1/1988 | European Pat. Off. . |
| 253123 | 1/1988 | European Pat. Off. . |
| 5966452 | 10/1982 | Japan . |
| 59-59724 | 4/1984 | Japan . |
| 62-68850 | 3/1987 | Japan . |
| 62-177065 | 8/1987 | Japan . |
| 62-257957 | 11/1987 | Japan . |
| 85/05372 | 12/1985 | PCT Int'l Appl. . |
| WO87/00540 | 1/1987 | World Int. Prop. O. . |

*Primary Examiner*—Ana L. Carrillo
*Attorney, Agent, or Firm*—Lowe, Price, LeBlanc, Becker & Shur

[57] ABSTRACT

Thermoplastic blend compositions comprise a polyamide, a carboxylated polyphenylene ether resin and an impact modifier. The carboxylated polyphenylene ether resin is the product of melt mixing a mixture consisting essentially of polyphenylene ether resin and a minor amount of an ethylenically unsaturated carboxylic acid compound. The impact modifier may comprise a graft of a vinyl aromatic polymer on a rubbery substrate; a vinyl aromatic-conjugated diene-vinyl aromatic triblock polymer; a carboxylated vinyl aromatic-conjugated diene-vinyl aromatic triblock polymer; a carboxylated alpha-olefin polymer; a copolymer of an alpha-olefin compound and an unsaturated carboxylic compound; a graft of a rigid acrylic polymer on a rubber substrate; a linear low density polyethylene; or mixtures thereof.

20 Claims, No Drawings

THERMOPLASTIC IMPACT MODIFIED POLYAMIDE-POLYPHENYLENE ETHER COMPOSITION

RELATED APPLICATION

This application is a continuation in part application of U.S. application Ser. No. 060,600 filed Jun. 11, 1987, now U.S. Pat. No. 4,798,865, which is a divisional application of U.S. application Ser. No. 805,644 filed Dec. 6, 1985, now U.S. Pat. No. 4,732,938.

FIELD OF THE INVENTION

This invention relates to highly heat-resistant polyamide compositions and more particularly to compositions comprising polyamides, phenylene ether resins and impact modifiers and to improved methods for the preparation of such resin compositions.

BACKGROUND OF THE INVENTION

Polyamides, commonly termed nylon resins, are well known for possessing an outstanding combination of strength, toughness and resistance to solvents. Unmodified nylons are widely used in applications requiring those characteristics where low or moderate loads will be encountered and particularly where exposure to extreme temperatures is not likely. Toughened versions of nylons have found increasing use in automotive applications such as trim parts, and reinforcement of polyamides with glass and glass/mineral combinations has extended their acceptance for such diverse applications as fan blades, valve covers, bicycle wheels and the like. However, for applications that require retention of mechanical properties for long periods of use at elevated temperatures, these compositions are also generally considered to be unsatisfactory. Additionally, even though glass and mineral fillers serve to increase rigidity and reduce the shrinkage tendencies of nylon resins, it is well known that filled compositions exhibit reduced ductility and toughness. Filled compositions also may have poor melt flow characteristics which in turn increases the difficulty of molding such compositions.

One method for improving the properties of thermoplastic polyamide compositions without reducing good flow and processing characteristics has been to blend polyamides with dissimilar resins. However, aliphatic and aromatic polyamides are highly polar materials. They are generally incompatible or at best only poorly compatible with a great many dissimilar resins, and particularly so with much less polar resins such as polyolefins, styrenic resins, phenylene ether resins and the like. Blends of polyamides with such resins often exhibit phase segregation in the melt and poor interphase adhesion, which results in delamination, lower ductility and generally poor mechanical properties in extruded or injection molded parts.

A method widely known in the art for overcoming such problems has been to provide more polar radicals or amine-reactive groups in the polymer chains of the less polar resins. Carboxylated polyolefins are known to form improved alloys with polyamides, as shown for example in U.S. Pat. No. 4,362,846, and styrenic resins containing a small amount of copolymerized functional monomer such a acrylic acid, maleic anhydride or an epoxy compound become grafted with polyamide when the two resins are melt-processed together, as is disclosed in U.S. Pat. Nos. 3,668,274 and 4,221,879. Processes for introducing reactive functionality such as carboxyl groups into phenylene ether resins are also well known. These modified resins are said to be useful for preparing polyphenylene ethers having chemically linked polyamide chains, as is disclosed in U.S. Pat. No. 3,259,520. Treating preformed polyphenylene ethers with a combination of a styrenic monomer and maleic anhydride in the presence of a free-radical initiator is shown in U.S. Pat. No. 4,097,556 to provide polyphenylene ether-styrene-maleic anhydride graft copolymers which are said to be useful in blends with polyamides. Processes for directly attaching maleic anhydride to phenylene ether resins in the presence of a peroxide are shown in published Japanese application Nos. 59/66452 and 59/59724. Blends of these maleated phenylene ether resins with polyamides are also disclosed therein.

Processes are thus now available for producing alloys of nylons with a variety of dissimilar resins, resulting materials having improved impact, reduced shrinkage and better oven warpage characteristics. Of particular interest for extended use under very severe high temperature conditions are blends of nylons with very high temperature resins such as polyphenylene ethers. These compositions exhibit good solvent resistance and, depending upon the ratio of the components, may possess useful high temperature resistance and good physical properties.

Although the methods available for preparing alloys of phenylene ether resins and polyamides appear to be successful, further improvements are needed. Chemical modification of phenylene ether resins, either by use of functional comonomers or in a post-reaction, requires additional and costly process steps. The methods presently known for directly modifying phenylene ether resins generally require extended mixing times at melt processing temperatures and/or the use of free-radical compounds, conditions which tend to promote cross-linking and/or deterioration of the resin. Extended mixing at high temperatures also increases energy consumption and adds to production costs. An improved method for preparing such alloys which substantially reduces processing times and minimizes resin cross-linking and degradation is needed.

Additionally, the impact properties of alloys of polyphenylene ether resins and polyamides are often unacceptably low for various application. Accordingly, means for improving the impact properties of such blend compositions without detrimentally affecting other properties of the compositions are desired.

SUMMARY OF THE INVENTION

Accordingly, it is an object of the present invention to provide improved thermoplastic blend compositions comprising a polyamide and a polyphenylene ether resin. More particularly, it is an object of the present invention to provide polyamidepolyphenylene ether blends which exhibit good compatibility between the polymer components. It is an additional object of the invention to provide blend compositions prepared according to methods which substantially reduce processing times and minimize resin cross-linking and degradation. It is a further object of the invention to provide such blend compositions which also exhibit good impact properties.

These and additional objects are provided by the thermoplastic blend compositions of the present invention which comprise a polyamide, a carboxylated polyphenylene ether resin and an impact modifier. The carboxylated polyphenylene ether resin is the product of melt mixing a mixture consisting essentially of polyphenylene ether resin and a minor amount of an ethylenically unsaturated carboxylic acid compound. The impact modifier may comprise a graft of a vinyl aromatic polymer on a rubbery substrate, a vinyl aromatic-conjugated diene-vinyl aromatic triblock polymer, a carboxylated vinyl aromatic-conjugated diene-vinyl aromatic triblock polymer, a carboxylated alpha-olefin polymer, a copolymer of an alpha-olefin compound and an unsaturated carboxylic compound, a graft of a rigid acrylic polymer on a rubbery substrate, a linear low density polyethylene, or mixtures thereof. The impact modifier provides the blends with improved impact strength.

These and additional objects and advantages will be more fully understood in view of the following detailed description.

DETAILED DESCRIPTION

The phenylene ether resins (or PPE resins) useful for the purposes of this invention include both the homopolymers prepared by the oxidative coupling of a 2,6-dialkylphenol as disclosed for example in U.S. Pat. No. 3,306,874, as well as the copolymers of 2,6-dialkylphenols and 2,3,6-trialkylphenols described in U.S. Pat. No. 4,011,200. In general, these resins are prepared by oxidative coupling of a 2,6-dialkylphenol such as 2,6-dimethylphenol or a mixture of a 2,6-dialkylphenol and a 2,3,6-trialkylphenol such as 2,3,6-trimethylphenol. In forming copolymers suitable for the practice of this invention, the proportion of 2,3,6-trialkylphenol will lie in the range of from about 2 to about 50 wt % based on total polyphenylene ether. However, the preferred copolymers will comprise from about 2 to 20 wt %, more preferably from about 2 to 10 wt % 2,3,6-trialkylphenol, and, correspondingly, from about 98 to about 80, more preferably from about 98 to about 90 wt % 2,6-dialkylphenol. The synthesis of these homopolymers and copolymers by a variety of oxidative coupling processes is well known in the art, and such polymers have become available to the art from commerical sources.

Carboxylation of the phenylene ether resin is carried out by melt-blending a mixture of the phenylene ether resin with a minor amount of an ethylenically-unsaturated compound containing a carboxylic group, e.g. a carboxylic acid, ester, amide or anhydride group, such as for example maleic anhydride, itaconic anhydride, glutonic anhydride, citraconic anhydride, tetrahydrophthalic anhydride or the like, as well as the carboxylic acid, ester, amide and imide analogs thereof, i.e., maleic acid, itaconic acid, fumaric acid, dimethylmaleate, maleimide, tetrahydrophthalimide and the like. The carboxylic compounds useful for the purposes of this invention may be more broadly characterized as having both a reactive ethylenic carbon-carbon double bond and a reactive carboxylic functional group.

The phenylene ether resin and the carboxylic compound are combined and melt-processed in conventional melt compounding equipment such as a compounding extruder or the like. Although it is at least conceptually possible to melt-mix the phenylene ether resin and then add the carboxylic compound thereto, the most practical and convenient processing method will be to dry blend the components thoroughly as powders and/or pellets to obtain a well-mixed and complete dispersion of the components and then melt-mix the dry blend. The application of high shearing forces together with external heating achieves a further thorough mixing of the components and melting of the resinous component and provides the conditions necessary to achieve the interaction of the carboxylic compound with the resin.

In carrying out the carboxylation step of the process of this invention, prolonged mixing times are to be avoided. Phenylene ether resins are high melt temperature materials and are difficult to melt mix thoroughly; high stock temperatures, normally in the range of from of from 600°–750° F. are commonly used in PPE compounding operations. High shear mixing devices such as for example single or twin screw compounding extruders, are therefore generally preferred for successful melt-processing. Such devices, and particularly twin-screw compounding extruders, can rapidly melt process PPE resins with high shear and thorough mixing, permitting shortened residence times and thus reducing the extent of exposure to severe heat conditions; i.e., the heat history of the resin is minimized. The use of heated roll mills, Banbury mixers and the like for compounding these resins may require extended mixing times, which increases the heat history of the resin and may crosslink, gel and/or oxidize the phenylene ether resin; hence although these devices may be employed for the purposes of this invention when care is used to avoid such detrimental results, these devices are not preferred.

The carboxylated phenylene ether resin produced in this process step may be used directly for preparing alloys with polyamides. However, the interaction of the carboxylic compound with the PPE resin may be incomplete, and the carboxylated polyphenylene ether may thus contain a substantial portion of unattached carboxylic compound, either as unreacted carboxylic compound or as a low-molecular weight reaction by-product. Low molecular weight carboxylic compounds such as maleic anhydride may interact deleteriously with polyamides under melt blending conditions and, depending on the chemical nature of the carboxylic compound, may cross link the polyamide and/or alter the molecular weight of the polyamide by chain scission or graft-linking reactions.

It may therefore be desirable to remove any remaining low molecular weight carboxylic compounds. In as much as the unattached low molecular weight compounds are volatile at the temperatures required for melt processing, these compounds may be readily removed by devolatilizing the melt during or after the carboxylation step preferably by means of a vented or vacuum-vented extruder. Alternatively the unattached carboxylic compounds, if present, may be removed from the carboxylated phenylene ether resin in a separate process step, such as by extraction with a suitable solvent, or by dissolving the resin in a suitable solvent and then re-precipitating the resin.

The amount of carboxylic compound employed will depend in part upon the particular carboxylic compound selected and upon the melt processing conditions and equipment used in the carboxylation step. In general, the level of carboxylic compound attached to the phenylene ether resin will desirably lie in the range of from about 0.05 to 2 wt. %, preferably 0.05 to about 1.0 wt. % and still more preferably, from 0.1 to about 0.5 wt. % based on the weight of the phenylene ether resin. At levels below this range, little if any effect will be seen, while at levels much above 0.75 wt. % and particularly above 1.0 wt. %, a substantial reduction may occur in the physical properties of resulting alloys, and some deterioration of the PPE resin may be seen. Where the melt processing conditions employed are highly effective in promoting the carboxylation, the level of carboxylic compound charged will approximate that desired in the carboxylated PPE. Where less efficient carboxylation processing conditions are used, and particularly where a devolatilization or other process step will be employed, thus removing any unattached low molecular weight carboxylic compound that results, higher levels of carboxylic compound may be charged. It may also be a desirable alternative method for some purposes to effect an even higher level of PPE carboxylation, then melt-blend the resulting carboxylated resin with sufficient un-carboxylated PPE resin to provide resin with the desired degree of carboxylation for further blending in the preparation of alloys with polyamide.

In preparing alloys of polyphenylene ether and polyamide according to the process of this invention, the carboxylated phenylene ether resin is further compounded with a polyamide resin. Generally, the blend will comprise from about 30 to about 90 percent by weight of polyamide resin and correspondingly from about 70 to about 10 percent by weight of carboxylated phenylene ether resin. At levels of polyamide below about 30 weight percent, the compositions may be difficult to process, have greater tendencies to delaminate and exhibit relatively poor chemical resistance. Hence such compositions are not preferred.

The polyamides useful for the purposes of this invention are the conventional injection-moldable polyamide resins known widely as nylon resins, including both aliphatic polylactams such as polycaprolactam (Nylon 6) and higher analogs such as Nylon 11 and Nylon 12, and polyamides formed from aliphatic diamines and aliphatic dicarboxylic acids such as polyhexamethylene sebacamide (Nylon 6,10), polyhexamethylene adipamide (Nylon 6,6) and the like. Further examples of useful polyamides include the amorphous as well as the crystalline versions, the toughened polyamides, and the aromatic-aliphatic copolymers, terpolymers and tetrapolymers. A great variety of these nylon resins are well-known and widely available commercially.

The blend compositions according to the invention further include an impact modifier and, more particularly, an impact modifier for the polyphenylene ether resin. Preferred impact modifiers for use in the blend compositions of the invention include grafts of a vinyl aromatic polymer on a rubbery substrate, vinyl aromatic-conjugated diene-vinyl aromatic triblock polymers, carboxylated vinyl aromatic-conjugated diene-vinyl aromatic triblock polymers, carboxylated alpha-olefin polymers, copolymers of an alpha-olefin compound and an unsaturated carboxylic compound, grafts of a rigid acrylic polymer on a rubbery substrate, linear low density polyethylene, and mixtures thereof. These impact modifiers have been determined to be particularly advantageous for improving the impact strength of the polyamide-carboxylated polyphenylene ether resin compositions of the invention. The impact modifier is preferably included in the blend compositions in an amount of from about 0.1 to about 40 wt. % and, more preferably, in an amount from about 1 to about 20 wt. %.

Impact modifiers comprising grafts of a vinyl aromatic polymer on a rubbery substrate which are suitable for use in the blend compositions of the invention include grafts of styrene on rubbery substrates such as butadiene or isoprene. The styrene included in the graft impact modifier may comprise unsubstituted styrene, nuclear or alpha-substituted styrene, for example substituted with one or more halogen groups and/or one or more alkyl groups containing 1 to 4 carbon atoms, or mixtures thereof. Preferably, the graft polymers contain an equal or greater amount of rubbery substrate as compared with the vinyl aromatic graft and, more preferably, the graft polymers contain from about 50 to about 75 wt. % of the rubbery substrate. These graft polymers may be prepared as emulsion grafts of styrene polymer on polybutadiene.

Additional impact modifiers for use in the blend compositions of the invention comprise vinyl aromatic-conjugated diene-vinyl aromatic triblock polymers. Preferred triblock polymers comprise styrene-butadiene-styrene triblock polymers and styrene-isoprene-styrene triblock polymers. As with the graft polymers described above, the styrene included in the triblock polymers may comprise unsubstituted styrene, nuclear or alpha substituted styrene, for example substituted with one or more halogen groups and/or one or more alkyl groups having 1 to 4 carbon atoms, or mixtures thereof. The triblock polymers may be hydrogenated or nonhydrogenated triblock polymers, both of which are well known in the art. In a preferred embodiment, the triblock polymer may be carboxylated with a carboxylic acid compound or derivative thereof prior to inclusion in the blend compositions. Preferred carboxylic compounds for use in such triblock polymers comprise maleic anhydride, itaconic anhydride, glutonic anhydride, citraconic anhydride, tetrahydrophthalic anhydride or the like, as well as the acid, ester, amide and imide analogs thereof. The carboxylated triblock polymers may be formed by blending the triblock polymer with the carboxylic compound. As will be demonstrated in the following examples, an impact modifier comprising a carboxylated triblock polymer may be formed in the presence of at least a portion of the carboxylated polyphenylene ether resin included in the final blend composition.

In accordance with an additional embodiment of the invention, the impact modifier may comprise a carboxylated alpha-olefin polymer or a copolymer of an alpha-olefin compound and a unsaturated carboxylic compound. Preferred alpha-olefin polymers for use in preparing these impact modifiers comprise ethylene polymers, ethylene-alkylene copolymers such as ethylene-propylene copolymers, and ethylene-alkylene-diene monomer terpolymers such as ethylene-propylene-diene terpolymers (EPDM). Suitable EPDM terpolymers are disclosed in U.S. Pat. Nos. 3,819,765 and 3,876,727. Carboxylic compounds which may be used to prepare the carboxylated alpha-olefin polymers may comprise any carboxylic acid or derivative thereof. Preferred carboxylic compounds comprise maleic anhydride, itaconic anhydride, glutonic anhydride, citraconic anhydride, tetrahydrophthalic anhydride or the like, as well as the acid, ester, amide and imide analogs thereof. Carboxylic compounds which may be used to prepare the copolymers of an alpha-olefin compound and an unsaturated carboxylic compound comprise both a reactive ethylenic carbon-carbon double bond and a reactive carboxylic functional group. A preferred unsaturated carboxylic compound comprises acrylic acid and preferred impact modifiers comprise ethylene-acrylic acid copolymers.

Impact modifiers suitable for use in the blend compositions of the invention may also comprise grafts of a rigid acrylic polymer on a rubbery substrate. Rigid acrylic polymers for use in the impact modifier grafts comprise acrylate polymers, methacrylate polymers, and alkyl substituted derivatives of these polymers. Alkyl groups of 1 to 4 carbon atoms are preferred among the alkyl substituted embodiments. Various rubbery substrates known in the art may be used in these graft polymers.

As will be demonstrated in the following examples, the impact modifiers disclosed herein may be used in the blend compositions singularly or in mixtures of two or more.

Combining the carboxylated phenylene ether resin with the polyamide and the impact modifier may be accomplished by any of the common melt blending processes, including the use of compounding extruders, Banbury mixers, roll mills and the like. The powdered or pelletized resins may be dry blended, then fed to the processing equipment, or, alternatively, one of the resinous components may be fluxed in the melt processing equipment, then combined by adding the remaining resinous component, together with additional pigments, dyes, fillers, stabilizers, antioxidants, lubricants, plasticizers and the like as may be desired, and according to the practices commonly employed in the thermoplastic compounding art. The impact modifier may be added to a portion or all of either an individual resinous component or to the blend of polyamide and carboxylated polyphenylene ether.

The resulting alloy is a readily melt-processable thermoplastic exhibiting no significant delamination. These compositions are thus not highly-crosslinked, and yet do not exhibit any of the characteristics of the incompatible mixtures attained by a simple mixing and molding of phenylene ether resins and nylons. Whether this composition is an alloy of now highly compatible components or is a graft resin comprising a graft of nylon and polyphenylene components is not known. Hence the product composition can best be described in terms of the method of its preparation.

The compositions of this invention are useful thermoplastics, and may be further modified by the addition of fillers, reinforcing fibers, dyes, pigments, flame retardants, antioxidants, stabilizers, plasticizers, processing aids and the like, as is well-known and practiced in the molding art. The compositions of the invention may be extended by further compounding with suitable resins, such as styrenic resins, including high impact polystyrene, as well as by the further addition of polyamides, polyphenylene ethers and the like. The additional components may be included in amounts of, for example, 0 to about 69 wt. %. The compositions of this invention may further be useful as modifiers, and particularly as aids for use in preparing further blends of phenylene ether resins and polyamides.

The invention will be better understood by consideration of the following examples, which are obtained by way of illustration of the invention and not in limitation thereof. Unless otherwise specified, amounts recited in the examples are in parts by weight. In the Examples, the following abbreviations and terms are employed:

PEC: copolymer of 2,6-dimethylphenol (95%) and 2,3,6-trimethylphenol (5%), prepared substantially by the process of U.S. Pat. No. 4,011,200
CPEC: carboxylated PEC Impact: Izod impact, ft lbs/in notch, ASTM D-256 A, at room temperature.

EXAMPLES 1–7, CARBOXYLATION OF POLYPHENYLENE ETHER RESINS

Dry blends of powdered PEC resins with varying levels of maleic anhydride were prepared by mixing the components thoroughly for five minutes in a Henschel blender. The dry blends were then fed to a 1¾" single screw compounding extruder, using a screw speed of 50 rpm and barrel and die temperatures in the range of 600°–620° F. and stock temperatures in the range of 600°–625° F., to melt process the mixture. Aliquot samples of the resin, after being dissolved in chloroform, reprecipitated with isopropanol and dried, were analyzed by FTIR to demonstrate the presence of bound maleic anhydride. Analysis by L/C methods were used to determine the level of free maleic anhydride in the carboxylated resins. The carboxylated polyphenylene ether compositions of Example 1–7 are summarized in Table I, together with Control Example A, a PEC resin subjected to the same compounding process steps in the absence of maleic anhydride.

TABLE I

| Ex. No. | 1 | 2 | 3 | 4 | 5 | 6 | 7 | A |
|---|---|---|---|---|---|---|---|---|
| PEC (pbw) | 100 | 100 | 100 | 100 | 100 | 100 | 100 | 100 |
| Maleic Anhyd charged (pbw) | 0.10 | 0.25 | 0.50 | 0.75 | 1.00 | 2.00 | 3.00 | 0 |
| Free Maleic, ppm | * | * | 10 | 40 | — | 665 | 1320 | 0 |

Notes:
Free Maleic = unattached maleic anhydride present in extrudate
* = below detection limits.

It will be apparent that the carboxylation of PEC using low levels of maleic anhydride is surprisingly effective in the absence of a free radical generator. However, with increasing levels of maleic anhydride (charged), the amount of free maleic anhydride in the resulting resin becomes substantial.

EXAMPLES 8–14, ALLOYS OF POLYAMIDE AND CARBOXYLATED POLYPHENYLENE ETHER RESINS

The carboxylated PEC resins of Examples 1–7 were melt blended with an equal weight of nylon 6,6 by melt-mixing a dry blend of pelletized resins in a 1¾" compounding extruder. The extrudate was chopped and injection molded on a 3 oz. Van Dorn screw injection molding machine to provide test specimens. The compositions and physical properties of the alloys are summarized in Table II.

TABLE II

| Ex. No. | 8 | 9 | 10 | 11 | 12 | 13 | 14 | B |
|---|---|---|---|---|---|---|---|---|
| Ex. No. | 1 | 2 | 3 | 4 | 5 | 6 | 7 | A |
| CPEC, pbw | 50 | 50 | 50 | 50 | 50 | 50 | 50 | 50 |
| Nylon 6,6 | 50 | 50 | 50 | 50 | 50 | 50 | 50 | 50 |
| Impact | 0.60 | 0.80 | 0.80 | 0.80 | 0.80 | 0.80 | 0.50 | 0.20 |
| Insol, pbw | 6.98 | 9.09 | 7.22 | 16.12 | 18.10 | — | 22.73 | 6.40 |

The insoluble component of each composition was determined by extracting a pelletized sample first with 90% formic acid, then with hot (100° C.) toluene, to remove both the polar and non-polar soluble resin components. The insoluble residue remaining, apparently a cross-linked composition containing nylon 6,6 and PEC, was not further melt processable and could not be melt-pressed into films.

The level of insolubles is quite low at levels of maleic anhydride (charged) below about 0.75 pbw (Examples 8-10), and increases sharply at and above that level. The impact properties of the alloys reaches a maximum at a level of only 0.25 pbw maleic anhydride, and is decreased significantly at the highest (3.0 pbw) level. It is thus apparent that the level of maleic anhydride needed to impart useful properties to the alloy is very low, with as little as 0.1 pbw providing significant improvement in impact.

EXAMPLES 15-21, IMPACT-MODIFIED ALLOYS OF NYLON 6,6 AND CARBOXYLATED PEC RESINS

The carboxylated PEC resins of Examples 1-7 were compounded with Nylon 6,6 and hydrogenated styrene-butadiene-styrene impact modifier, obtained as Kraton G 1651 from Shell Oil Company. The dry blends were prepared, melt mixed, and molded substantially by the procedures used in Examples 7-14.

The compositions and the physical properties of injection molded samples are summarized in Table III.

TABLE III

| Ex. No. | 15 | 16 | 17 | 18 | 19 | 20 | 21 | c |
|---|---|---|---|---|---|---|---|---|
| Ex. No. | 1 | 2 | 3 | 4 | 5 | 6 | 7 | A |
| CPEC, pbw | 50 | 50 | 50 | 50 | 50 | 50 | 50 | 50 |
| Nylon 6.6 pbw | 50 | 50 | 50 | 50 | 50 | 50 | 50 | 50 |
| Kraton G | 5 | 5 | 5 | 5 | 5 | 5 | 5 | 5 |
| Impact | 0.90 | 2.80 | 3.00 | 2.70 | 2.80 | 2.60 | 2.30 | 0.5 |
| Yield (psi) | 9070 | 9225 | 9290 | 9300 | 9265 | 9210 | 9367 | 8743 |
| Tens. Mod. (Kpsi) | 335 | 366 | 363 | 361 | 361 | 359 | 369 | 342 |
| E (%) * | 32 | 142 | 102 | 59 | 52 | 124 | 154 | 5 |
| COLOR Delta E | 1.64 | 4.02 | 6.74 | 9.19 | 13.64 | 20.47 | 23.96 | 0 |

Notes: * Single-point determinations. Yield = tensile yield. Tens. Mod. = tensile modulus. E = tensile elongation. Color shifts determined by Macbeth 1500 color analyzer, reported as delta E values compared with control C.

A comparison of Examples 15-21 with Examples 8-14, respectively, demonstrates that the impact modifier included in blends 15-21 provided the blends with significantly improved impact strength properties. The compositions of Examples 15-17 again demonstrate that significant property improvements are realized even with levels of maleic anhydride charged as low as 0.1, and littler further improvement is seen for level above 0.50. With further increases in maleic anhydride above about 0.75, some decrease in most properties will be noted. At levels of maleic anhydride above about 0.75 and particularly above about 1.0, the color of the resulting blends will be seen to deteriorate substantially, as reflected by the color data summarized in Table III.

In the following Examples 22-29, further impact modified blends were prepared and molded substantially as in Examples 15-21, but using a variety of impact modifiers according to the present invention. In the following Examples 22-29, the following abbreviations are used:

PPEMA1: a carboxylated polyphenylene ether resin according to the present invention formed from 1.0 wt. % maleic anhydride
PPEMA2: a carboxylated polyphenylene ether resin according to the present invention formed from 0.5 wt. % maleic anhydride
PPEMA3: a carboxylated polyphenylene ether resin similar to PPEMA2 only prepared in a different batch
SBG1: a graft of a styrene polymer on a butadiene substrate comprising 50 wt. % butadiene, emulsion polymerized
SBG2: a graft of a styrene polymer on a butadiene substrate comprising 75 wt. % butadiene, emulsion polymerized
SBG3: a graft of a styrene polymer on a butadiene substrate comprising 60 wt. % butadiene, emulsion polymerized
Kraton G1651: a hydrogenated styrene-butadiene-styrene triblock polymer supplied by Shell Oil Company
Kraton D1101: an unsaturated styrene-butadiene-styrene triblock polymer supplied by Shell Oil Company
PMMRG: a shell-core copolymer comprising polymethylmethacrylate grafted on a cross-linked butylacrylate substrate supplied by Rohm & Haas Company under the tradename Acryloid KM680
EPMA1: a maleic anhydride grafted ethylene-propylene copolymer comprising 75 wt. % ethylene and 0.84 wt. % grafted maleic anhydride
EPMA2: a maleic anhydride grafted ethylene-propylene copolymer comprising 45 wt. % ethylene and 0.35 wt. % grafted maleic anhydride
EAA: an ethylene-acrylic acid copolymer supplied by CdFCheme under the tradename Lotader AX8040
LLDPE: a linear low density polyethylene supplied by Union Carbide under the tradename UC7042
HIPS: an impact modified polystyrene supplied by Mobil Corporation under the tradename Mobil 4514
Izod: notched Izod impact measured on a 0.125"×0.5" specimen, ft-lb/in
Dynatup: instrumented dart impact, 0.5" tup, 1.5" test area, total impact energy, ft-lb
HDT: heat distortion temperature, 0.125"×0.5"×approx. 4¾" test specimen, unannealed, 264 psia, °F.
Viscosity: measured at 550° F., 500/s, poise
Tensile Yield Strength: potential yield strength, 0.2"/min cross head speed, psi
Tensile Break Strength: tensile break strength, psi
Tensile Modulus: ×10$^{-5}$ psi
Flexural Strength: 0.05"/min cross head speed, psi
Flexural Modulus: ×10$^{-5}$.

Unless otherwise noted, the blend compositions of examples 22-29 were prepared by tumble blending the components and extruding on a 28 mm twin screw extruder at 175 RPM with the barrel zone set at 450° F. for the feed zone and 580° F. for the remainder of the zones, including the die. The resulting strand was pelletized, dried and injection molded into test specimens at a stock temperature of 570° to 590° F.

EXAMPLE 22

This example demonstrates blend compositions including impact modifiers comprising grafts of styrene on butadiene substrates. These blend compositions were compounded on a 30 mm twin screw extruder at 300 RPM using a feed zone temperature of 150° C. and a temperature of 300° C. for the remainder of the zones. The components of the blend compositions and the physical properties of the compositions are set forth in Table IV.

TABLE IV

| Blend | 22A | 22B | 22C |
|---|---|---|---|
| PPEMA1 | 40 | 43.3 | 41.6 |

TABLE IV-continued

| Blend | 22A | 22B | 22C |
|---|---|---|---|
| Nylon 6/6 | 40 | 43.4 | 41.8 |
| SBG1 | 20 | — | — |
| SBG2 | — | 13.3 | — |
| SBG3 | — | — | 16.6 |
| Izod | 2.7 | 1.9 | 4.0 |
| Tensile Properties: | | | |
| Yield Strength | 7927 | 7795 | 7927 |
| Modulus | 2.92 | 2.94 | 3.13 |
| Elongation, % | 74 | 97 | 101 |

The Izod measurements set forth in Table IV demonstrate that the impact modifiers comprising grafts of styrene on butadiene provided the blend compositions with improved impact strength as compared with blends not including an impact modifier, for example, the blends of examples 8-14 set forth in Table II.

EXAMPLE 23

This example demonstrates blend compositions of the invention including impact modifiers comprising a triblock polymer, a carboxylated alpha-olefin polymer, a graft of a rigid acrylic polymer on a rubbery substrate, and mixtures thereof. The components of the blend compositions and the physical properties of the compositions are set forth in Table V.

TABLE V

| Blend | 23A | 23B | 23C | 23D | 23E | 23F | 23G | 23H | 23I | 23J | 23K |
|---|---|---|---|---|---|---|---|---|---|---|---|
| PPEMA1 | 50 | 47.5 | 45 | 42.5 | 40 | 45 | 42.5 | 45 | 45 | 45 | 45 |
| Nylon 6/6 | 50 | 47.5 | 45 | 42.5 | 40 | 45 | 42.5 | 45 | 45 | 45 | 45 |
| Kraton G 1651 | — | 5 | 10 | 15 | 20 | — | — | — | — | — | 5 |
| Kraton D 1101 | — | — | — | — | — | 10 | 15 | — | — | — | — |
| PMMRG | — | — | — | — | — | — | — | 10 | — | — | — |
| EPMA1 | — | — | — | — | — | — | — | — | 10 | — | 5 |
| EPMA2 | — | — | — | — | — | — | — | — | — | 10 | — |
| Izod, 73° F. | 0.8 | 3.6 | 9.2 | 11.4 | 12.4 | 3.2 | 3.8 | 2.8 | 5.4 | 9.5 | 11.0 |
| Izod, −20° F. | 0.5 | 1.7 | 2.8 | 4.1 | 5.2 | 2.2 | 3.4 | 1.6 | 2.3 | 3.1 | 3.4 |
| Dynatup, 73° F. | 2.8 | 42.5 | 42.7 | 35.9 | 39.1 | 40.1 | 41.8 | 37.8 | 36.7 | 39.3 | 44.6 |
| Dynatup, −20° F. | 2.4 | 15.1 | 25.8 | 35.8 | 31.4 | 9.3 | 33.9 | 12.8 | 23.4 | 39.1 | 40.5 |
| HDT, 264 psia, IMU, °F. | 274 | 252 | 205 | 198 | 193 | 232 | 196 | 250 | 250 | 173 | 174 |
| HDT, 264 psia, IMA, °F. | 332 | 312 | 278 | 237 | 216 | 290 | — | 311 | — | 238 | 241 |
| Viscosity, poise | 2420 | 2168 | 2723 | 1936 | 4108 | 2279 | 4862 | 2590 | 5016 | 2580 | 4614 |
| Tensile properties: | | | | | | | | | | | |
| Yield, psi | 10580 | 9320 | 8235 | 7290 | 6490 | 8400 | 7327 | 9120 | 7903 | 7925 | 7920 |
| Elongation, % | 87 | 68 | 119 | 144 | 134 | 125 | 117 | 116 | 89 | 91 | 99 |
| Modulus, × 10$^{-5}$ psi | 4.38 | 3.64 | 3.20 | 2.83 | 2.58 | 3.20 | 2.80 | 3.20 | 3.04 | 2.83 | 3.04 |

A comparison of the Izod impact of blend composition 23A which does not include an impact modifier with the Izod impacts of blend compositions 23B-23K demonstrates that the impact modifiers included in these blend compositions provided the compositions with improved Izod impact strength, both at room temperature and at low temperatures. The Dynatup measurements of the compositions 23B-23K are similarly improved as compared with the Dynatup measurements of blend composition 23A which does not include an impact modifier. A comparison of blend composition 23K with blend compositions 23C and 23I indicates that better impact properties were provided by blend 23K including 5 parts by weight each of Kraton G1651 and EPMA1 as compared with either blend composition 23C containing 10 parts by weight of Kraton G1651 or blend composition 23I containing 10 parts by weight EPMA1. Thus, blends of two or more of the impact modifiers according to the present invention also provide improved compositions of polyphenylene ether and polyamide.

EXAMPLE 24

This example further demonstrates further blend compositions according to the present invention including impact modifiers comprising triblock polymers, carboxylated alpha-olefin polymers, and mixtures thereof. Table VI sets forth the components of the blend compositions and the physical properties of the compositions.

TABLE VI

| Blend | 24A | 24B | 24C | 24D | 24E | 24F | 24G |
|---|---|---|---|---|---|---|---|
| PPEMA2 | 45 | 45 | 42.5 | 45 | 42.5 | 45 | 42.5 |
| Nylon 6/6 | 45 | 45 | 42.5 | 45 | 42.5 | 45 | 42.5 |
| Kraton G 1651 | 10 | — | — | 5 | 5 | 5 | 5 |
| EPMA2 | — | 10 | 15 | 5 | 10 | — | — |
| EPMA1 | — | — | — | — | — | 5 | 10 |
| Izod, 73° F. | 4.5 | 4.8 | 3.9 | 5.0 | 3.7 | 5.3 | 1.4 |
| Izod, −20° F. | 3.3 | 3.1 | 3.2 | 3.5 | 3.4 | 4.2 | 1.2 |
| Dynatup, 73° F. | 30.0 | 20.8 | 10.8 | 41.1 | 7.6 | 16.1 | 5 |
| Dynatup, 20° F. | 33.6 | 31.2 | 8.1 | 43.3 | 8.8 | 10.9 | 0.7 |
| Dynatup, Heat aged, 4 hrs. at 375° F. | 35.7 | 5.6 | 3.7 | 29.8 | 4.2 | 3.4 | 5.1 |
| HDT, 264 psia, °F. | 285 | 195 | 171 | 224 | 187 | 212 | 212 |

The results set forth in Table VI demonstrate that blend compositions containing mixtures of impact modifies according to the invention exhibit improved impact strength as well as blend compositions including a single impact modifier.

EXAMPLE 25

This Example demonstrates impact modified blend compositions wherein the impact modifier comprises an ethylene-acrylic acid copolymer, Kraton G 1651, or mixtures thereof. The components of the blend compositions and the physical properties of the resulting blends are set forth in Table VII. The blends were compounded on the 30 mm twin screw extruder as set forth in Example 22.

TABLE VII

| Blend | 25A | 25B | 25C | 25D | 25E | 25F |
|---|---|---|---|---|---|---|
| PPEMA1 | 55 | 55 | 55 | 55 | 55 | 55 |
| Nylon 6/6 | 45 | — | — | 45 | 45 | 45 |
| Amorphous Nylon | — | 45 | 45 | — | — | — |
| Kraton G-1651 | 5 | 5 | 5 | 2.5 | — | — |
| EAA | — | — | — | 2.5 | 5 | 10 |
| Heat Stabilizer | 0.25 | 0.25 | — | 0.25 | 0.25 | 0.25 |
| Notched Izod | 2.8 | 1.6 | 2.0 | 3.3 | 2.6 | 3.8 |
| Dynatup, 73° F. | 44.9 | 48.7 | 47.3 | 41.9 | 46.4 | 41.1 |
| Dynatup, −20° F. | 15.3 | 22.8 | 26.5 | 25.7 | 13.9 | 29.4 |

TABLE VII-continued

| Blend | 25A | 25B | 25C | 25D | 25E | 25F |
|---|---|---|---|---|---|---|
| HDT, 264 psia, °F. | 293,286 | 263 | 260 | 293 | 294 | 270 |
| Tensile Properties: | | | | | | |
| Yield Strength | 9115 | 8790 | 8715 | 9220 | 9223 | 8195 |
| Break Strength | 8500 | 7740 | 8055 | 9240 | 8497 | 8355 |
| Modulus | 3.37 | 3.39 | 3.50 | 3.35 | 3.50 | 3.05 |
| Elongation | 99 | 99 | 143 | 161 | 101 | 136 |

Blend compositions 25B and 25C represent blends of amorphous nylon with carboxylated PPE while blends 25A and 25D–25F comprise blends of nylon 6/6 with carboxylated PPE. Blend compositions 25E and 25F demonstrate that the ethylene-acrylic acid copolymer improves the impact strength of the polyamide-carboxylated PPE blend. Additionally, a comparison of composition 25D containing 2.5 pbw each of EAA and Kraton G 1651 with blend compositions 25D and 25E which contain 5 pbw EAA and Kraton G 1651, respectively, demonstrates that the composition including the blend of impact modifiers exhibits better notched Izod impact strengths as compared with the compositions containing a single impact modifier.

EXAMPLE 26

This example demonstrates blend compositions including an impact modifier comprising linear low-density polyethylene, Kraton G 1651, or mixtures thereof. The components of the blend compositions and the physical properties of the compositions are set forth in Table VIII.

TABLE VIII

| Blend | 26A | 26B | 26C | 26D | 26E | 26F | 26G | 26H | 26I |
|---|---|---|---|---|---|---|---|---|---|
| PPEMA3 | 55 | 45 | 47 | 43.5 | 49 | 52.5 | 52.5 | 55 | 45 |
| Nylon 6/6 | 40 | 40 | 33 | 31.5 | 36 | 37.5 | 37.5 | 40 | 40 |
| Kraton G-1651 | 5 | 5 | 5 | 5 | 5 | 5 | — | 5 | 5 |
| LLDPE | — | 10 | 15 | 20 | 10 | 5 | 10 | — | 10 |
| Heat Stabilizer | — | — | — | — | — | — | — | 0.5 | 0.5 |
| Izod | 3.2 | 3.9 | 0.7 | 0.6 | 2.3 | 4 | 2.4 | 2.9 | 4.2 |
| HDT, 264 psia, °F. | 275 | 213 | 210 | 160 | 262 | 189 | 188 | 224 | 229 |
| Dynatup, 73° F. | 42 | 36.5 | 9 | 2 | 38 | 42 | 38 | 41 | 41 |
| Dynatup, −20° F. | 16 | 31 | 2 | 2 | 34 | 38 | 15 | 27 | 39 |
| Dynatup, Heat aged, 4 hrs. at 375° F. | 34 | 33 | 8 | 3 | 34 | 41 | 33 | 45 | 37 |
| Tensile Yield Strength | 8190 | 6957 | 3546 | 4318 | 6435 | 7595 | 7855 | 8610 | 7155 |
| Modulus | 3.05 | 2.56 | 2.3 | 1.99 | 2.7 | 3.11 | 3.14 | 3.67 | 3.07 |

The results set forth in Table VIII demonstrate that smaller amounts of linear low-density polyethylene, more particularly amounts less than 15 pbw, improve the impact strength of the polyamide-carboxylated PPE blend compositions. Additionally, the linear low-density polyethylene may be used alone or in combination with an additional impact modifier such as Kraton G 1651 to provide improved impact properties.

EXAMPLE 27

This Example demonstrates the preparation of carboxylated triblock polymers which are useful as impact modifiers in the blend compositions of the invention. The components of the carboxylated modifiers formed in this Example are set forth in Table IX. Impact modifiers 27A and 27B were prepared by compounding the triblock polymer and maleic anhydride at a temperature of about 450° F. Impact modifiers 27C and 27D were prepared by compounding the triblock polymer, a portion of polyphenylene copolymer and maleic anhydride at a compounding temperature of about 600° F. Although the resultant impact modifiers are referred to as carboxylated triblock polymers, it has not been determined if the maleic anhydride actually grafted to the triblock polymers or is a blend with the triblock polymers. Thus, within the context of the present invention, the term carboxylated triblock polymers refers to the product obtained by compounding the carboxylic compound with the triblock polymer at an elevated temperature.

TABLE IX

| Blend | 27A | 27B | 27C | 27D |
|---|---|---|---|---|
| Kraton G 1651 | 100 | — | 18.2 | — |
| Kraton D 1101 | — | 100 | — | 18.2 |
| PEC | — | — | 81.8 | 81.8 |
| Maleic Anhydride | 0.5 | 0.5 | 0.5 | 0.5 |
| Compounding Temperature, °F. | 450 | 450 | 600 | 600 |

EXAMPLE 28

This example demonstrates blend compositions including impact modifiers comprising the carboxylated triblock polymers prepared in Example 27. Blend compositions were also prepared including impact modifiers comprising the non-carboxylated triblock polymers. The components of the blend compositions and the physical properties of the compositions are set forth in Table X.

TABLE X

| Blend | 28A | 28B | 28C | 28D | 28E | 28F |
|---|---|---|---|---|---|---|
| 27A | 10 | — | — | — | — | — |
| 27B | — | 10 | — | — | — | — |
| 27C | — | — | 55 | — | — | — |
| 27D | — | — | — | 55 | — | — |
| Kraton G 1651 | — | — | — | — | 10 | — |
| Kraton D 1101 | — | — | — | — | — | 10 |
| PPEMA2 | 45 | 45 | — | — | 45 | 45 |
| Nylon 6/6 | 45 | 45 | 45 | 45 | 45 | 45 |
| Notched Izod | 6.9 | 1.2 | 11.3 | 1.7 | 5.4 | 1.7 |
| Izod, −20° F. | 3.1 | 0.9 | 3.0 | 0.5 | 2.8 | 1.1 |
| Dynatup, 73° F. | 44.4 | 7.0 | 41.1 | 29.2 | 41.8 | 46.3 |
| Dynatup, −20° F. | 17.9 | 1.1 | 23.9 | 4.2 | 13.8 | 4.3 |
| HDT, 264 psia, °F. (low) | 249 | 230 | 238 | 233 | 238 | 233 |
| (high) | — | 294 | — | 286 | 268 | 243 |
| Tensile Properties: | | | | | | |
| Yield Strength | 8203 | 8535 | 8600 | 9910 | 7766 | 8163 |
| Modulus | 3.26 | 3.19 | 3.32 | 3.69 | 2.74 | 3.21 |
| Elongation (%) | 118 | 47 | 82 | 85 | 111 | 70 |

The results set forth in Table X demonstrate that blend compositions including carboxylated hydrogenated triblock polymer as an impact modifier, namely compositions 28A and 28C, exhibited significantly improved impact properties, even as compared with blend compositions including the non-carboxylated hydrogenated triblock polymer, namely composition 28E. Although the blend compositions containing carboxylated non-hydrogenated triblock polymer, namely blends 27B and 27D, exhibited improved impact strength over blend compositions not containing any impact modifier, the impact strengths exhibited by these blends were not as significantly improved as the impact strengths exhibited by compositions 27A and 27C. It is believed, although the inventors are not bound by the same, that the non-saturated triblock polymer may be unstable above temperatures of about 450° F. and that blends containing non-hydrogenated triblock polymer may exhibit further improved impact strengths if procesed at lower temperatures than those employed in the present Example.

EXAMPLE 29

This Example demonstrates two impact modified blend compositions according to the presenting invention further including a styrene polymer component, specifically a high impact polystyrene. The components of the blend compositions and physical properties of the compositions are set forth in Table XI.

TABLE XI

| Blend | 29A | 29B |
|---|---|---|
| PPEMA2 | 45 | 45 |
| Nylon 6/6 | 40 | 40 |
| HIPS1 | 10 | 5 |
| Kraton G-1650 | 5 | 5 |
| EPMA1 | — | 5 |
| Izod, 73° F. | 1.4 | 4.4 |
| Dynatup, 73° F. | 22.7 | 37.3 |
| Dynatup, −20° F. | 2.5 | 32 |

EXAMPLE 30

In the following, Examples 30A–30D are comparative wherein carboxylation of PEC resin with maleic anhydride was carried out substantially by the processes of Example 1–7, but including dicumylperoxide as a free-radical generator. The resulting compositions were then melt-blended with Nylon 6,6 as in Examples 8–15, and molded to provide specimens for testing. The compositions and their physical properties are summarized in Table XII. Example 30E, a composition according to the practice of this invention, is provided by way of comparison.

TABLE XII

| Ex. No. | 30A | 30B | 30C | 30D | 30E |
|---|---|---|---|---|---|
| Carboxylation | | | | | |
| PEC (pbw) | 100 | 100 | 100 | 100 | 100 |
| Maleic Anh. charged (pbw) | 0.5 | 0.5 | 0.5 | 0.5 | 0.5 |
| DiCUP (pbw) | 0.1 | 0.5 | 1.0 | 0.0 | 0.0 |
| Blends | | | | | |
| Carboxy PEC (pbw) | 47.5 | 47.5 | (a) | 47.5 | 47.5 |
| Nylon 6,6 (pbw) | 47.5 | 47.5 | — | 47.5 | 47.5 |
| Kraton G (pbw) | 5.0 | 5.0 | — | 5.0 | 5.0 |
| DiCUP (pbw) | — | — | — | 0.5 | — |
| Impact | 2.3 | 2.4 | — | 1.5 | 2.9 |

Notes:
(a) Composition 30C cross-linked in the extruder during carboxylation. No blend with Nylon 6,6 was attempted.

It will be apparent from these data that the use of a free-radical generator either in the carboxylation step as in Comparative Examples 30A–30C, or during the blending with the polyamide as in Comparative Example 30D, has a detrimental effect on impact properties, with severe degradation at the higher levels of peroxide.

EXAMPLE 31

An alternative method for preparing blends of polyamides and phenylene ether resins by melt-mixing a mixture of the polyamide, the phenylene ether resin and maleic anhydride, as taught by U.S. Pat. No. 4,315,086 was evaluated. The components were dry-blended, then melt-mixed by feeding the mixture to either a 1¾" single screw extruder (Comparative Example 31A) or a 28-mm co-rotating twin screw extruder (Comparative Example 31B), in order to accomplish an extended residence time. The blends were extruded, pelletized and injection-molded to provide test specimens. The formulations and properties are summarized in Table XIII. Example 31C, a composition according to the teachings of this invention was prepared for comparison purposes, by first melt-mixing the PEC and maleic anhydride, then adding the nylon component as in Examples 1–15.

TABLE XIII

| Ex. No. | 31A | 31B | 31C | 12 |
|---|---|---|---|---|
| Components | | | | |
| PEC (pbw) | 50 | 50 | 50 | 50 |
| Maleic Anhyd (pbw) | 1.0 | 1.0 | 0.5 | 1.0 |
| Nylon 6,6 (pbw) | 50 | 50 | 50 | 50 |
| F-88 (pbw) | 0.5 | 0.5 | 0.5 | — |
| Impact | 0.25 | 0.4 | 0.72 | 0.80 |
| Compatible | delamin brittle | smooth ductile | smooth ductile | smooth ductile |

It will be apparent form consideration of these examples that melt-mixing a mixture of the polyamide, phenylene ether resin and maleic anhydride in a single step, whether using brief residence times (Comparative Example 31A) or extended and more intense mixing, (Comparative Example 31B) provides blends that are distinctly inferior in impact, when compared with the products prepared by the improved process of this invention (Examples 12 and 31C).

COMPARATIVE EXAMPLE 32

A further comparative example was carried out by melt-mixing a mixture of 12.5 pbw polyamide (Nylon 6,6), 50 pbw PEC, 0.625 pbw maleic anhydride and 0.3125 pbw lubricant (Pluronic F88: an ethylene oxide propylene oxide copolymer supplied by Wyandotte Chemical Co.) in a 28 mm co-rotating twin screw extruder. The resulting blend was then further compounded on the twin screw extruder with 37.5 pbw Nylon 6,6 and 5 pbw Kraton G impact modifier. The extrudate was pelletized and injection molded to provide test specimens having a Izod impact value of 1.9 ft. lbs/in. notch. An equivalent composition prepared by the process of this invention from 50 pbw carboxylated PPE (1.0 pbw maleic anhydride), to pbw Nylon 6,6 and 5 pbw Kraton G had an Izod impact value of 3.5 ft lbs/in notch.

The process of this invention thus provides impact modified alloys having substantially better properties than those produced in the prior art processes.

COMPARATIVE EXAMPLE 33

A further comparative example was carried out by first melt compounding 100 pbw Nylon 6,6 with 1.0 pbw maleic anhydride in a 28-mm twin screw extruder, then adding 100 pbw PEC resin, pelletizing the resulting blend and injection molding the pellets to provide test specimens. The resulting blend had a notched Izod impact at room temperature of 0.24 fe lbs/in. notch, again inferior to the blends prepared by the improved process of this invention (c.f. Table II, Example 12, having an impact of 0.80 ft. lbs/in. notch).

It will be apparent that blends prepared according to the teachings of the invention exhibit substantially improved properties over those prepared by prior art processes such as those of U.S. Pat. No. 4,315,086, or by the similar processes of Japanese published application Nos. 59/66452 and 59/59724 which employ a free-radical initiator in the carboxylation step.

COMPARATIVE EXAMPLE 34

A quantity of the carboxylated PEC resin of Example 3 was dissolved in chloroform, then reprecipitated in methanol to ensure the substantial absence of all low molecular weight components, including minor amounts of unreacted maleic anhydride. The carboxylated resin, after drying, was compounded with Nylon 6,6, Kraton G and varying amounts of maleic anhydride, using a 28 mm twin screw compounding extruder. The resulting blends were injection molded as before and tested. The composition and properties are summarized in Table XIV.

TABLE XIV

| Ex. No. | 34A | 34B | 34C |
| --- | --- | --- | --- |
| Rept. Carboxy PEC pbw | 47.5 | 47.5 | 47.5 |
| Nylon 6,6 pbw | 47.5 | 47.5 | 47.5 |
| Kraton G, pbw | 5.0 | 5.0 | 5.0 |
| Maleic Anhy, pbw | 0 | 0.5 | 1.0 |
| Impact | 3.9 | 3.2 | 2.2 |
| Color |  |  |  |
| Delta E | 0 | 3.0 | 7.77 |

Color shitfs. delta E, compared with control L: see notes to Table III.

It will again be apparent that the presence of maleic anhydride in blends of PEC and polyamides during the melt processing step has a deleterious effect on properties and on color, even though the PEC resin is first carboxylated according to the teachings of this invention.

EXAMPLE 35

A homopolymer of 2,6-dimethylphenol, H-PPE, prepared by the polymerization process described in U.S. Pat. No. 4,011,200, was carboxylated according to the procedure used in Examples 1-7, using 100 pbw H-PPE and 0.5 pbw maleic anhydride. The carboxylated H-PPE (47.5 pbw) was then melt-blended with 47.5 pbw Nylon 6,6 and 5.0 pbw Kraton G impact modifier, using the procedures of Examples 15-21. The extrudate was smooth and ductile, and injection molded specimens had an Izod impact value of 2.5 ft. lbs/in. notch.

EXAMPLE 36

PEC resin (100 pbw) and 1.0 pbw of itaconic acid were dry blended and melt-compounded in a 1¾" single screw extruder. The resulting carboxylated PEC resin (50 pbw) was then melt-blended with 50 pbw Nylon 6,6 in a compounding extruder, providing a smooth, ductile extrudate. The extrudate, on injection molding, gave test specimens having a 0.50 ft lbs/in. notch Izod impact value.

COMPARATIVE EXAMPLE 37

The procedure of Example 36 was repeated using 1.0 pbw succinic anhydride in place of the itaconic acid. The blend of carboxylated PEC resin with Nylon 6,6 gave only a poorly compatibilized mixture when compounded on a single screw extruder, which had poor integrity. The blend was not to be molded. Compounding in a 28 mm twin screw extruder afforded only slight improvement, giving test specimens having a 0.21 ft lbs/in. notch. The procedure was repeated, using 1.0 pbw succinic anhydride and 0.5 pbw dicumyl peroxide per 100 pbw PEC. The blend of this material with Nylon 6,6 gave very rough, brittle extrudate when compounded on the twin screw extruder.

It will therefore be apparent that only ethylenically-unsaturated carboxylic compounds are effective in the carboxylation of PPE resins. The saturated analogs such as succinic anhydride are ineffective, even when employed together with a free-radical generator such as a peroxide compound.

The polyamide-carboxylated phenylene ether resin compositions of this invention are useful thermoplastics in a variety of engineering applications. They may also be further blended with additional phenylene ether resin that has not been carboxylated without detrimental effects on properties.

EXAMPLE 38

PEC resin, 20 pbw, was blended with 30 pbw of the carboxylated phenylene ether resin of Example 5, 50 pbw Nylon 6,6 and 5 pbw Kraton G. The injection molded product had an Izod impact value of 3.0 ft lbs/in. notch, quite comparable with the impact properties of Example 19, prepared using only the carboxylated PPE resin of Example 5.

This invention will thus be seen to be an improved process for preparing alloys and blends of polyamides with phenylene ether resins, wherein the phenylene ether resin is first carboxylated by melt-mixing a mixture consisfing essentially of 100 parts by weight of a phenylene ether resin from 0.005 to about 2.0, preferably 0.1 to about 1.0, parts by weight of an ethylenically unsaturated carboxylic acid compound, then melt-blended with a polyamide, as well as improved polyamide phenylene ether resin compositions prepared by the process of this invention.

The preceding examples are set forth to illustrate specific embodiments of the invention and are not intended to limit the scope of the compositions and methods of the present invention. Additional embodiments and advantages within the scope of the claimed invention will be apparent to one of ordinary skill in the art.

What is claimed is:

1. A thermoplastic blend composition, comprising (a) from about 30 to about 90 weight percent polyamide, (b) from about 10 to about 70 weight percent carboxylated polyphenylene ether resin which is the product of melt mixing a mixture consisting essentially of 100 parts by weight polyphenylene ether resin and 0.05 to 1 part by weight of an ethylenically unsaturated carboxylic acid compound, and (c) from about 0.1 to about 40 weight percent of an impact modifier selected from the group consisting of grafts of a vinyl aromatic polymer on a diene rubber substrate; vinyl aromatic-conjugated diene-vinyl aromatic triblock polymers; carboxylated vinyl aromatic-conjugated diene-vinyl aromatic triblock polymers; carboxylated hydrogenated vinyl aromatic-conjugated diene-vinyl aromatic triblock polymers; copolymers of an alpha-olefin compound and an unsaturated carboxylic compound; grafts of an acrylic polymer on an acrylate rubber substrate; linear low density polyethylene, and mixtures thereof.

2. A thermoplastic blend composition as defined by claim 1, wherein the impact modifier is included in an amount of from about 1 to about 20 weight percent.

3. A thermoplastic blend composition as defined by claim 1, wherein the impact modifier comprises graft of styrene polymer on butadiene substrate.

4. A thermoplastic blend composition as defined by claim 1, wherein the impact modifier comprises from about 50 to about 75 weight percent butadiene.

5. A thermoplastic blend composition as defined by claim 1, wherein the impact modifier comprises a non-hydrogenated styrene-butadiene-styrene triblock copolymer.

6. A thermoplastic blend composition as defined by claim 1, wherein the impact modifier comprises a carboxylated styrene-butadiene-styrene triblock copolymer.

7. A thermoplastic blend composition as defined by claim 6, wherein the impact modifier comprises the product of blending a styrene-butadiene-styrene triblock copolymer and maleic anhydride.

8. A thermoplastic blend composition as defined by claim 7, wherein the impact modifier blend product is formed in the presence of at least a portion of the carboxylated polyphenylene ether resin.

9. A thermoplastic blend composition as defined by claim 1, wherein the impact modifier comprises a copolymer of ethylene and an unsaturated carboxylic compound.

10. A thermoplastic blend composition as defined by claim 9, wherein the impact modifier comprises an ethylene-acrylic acid copolymer.

11. A thermoplastic blend composition as defined by claim 1, wherein the impact modifier comprises a carboxylated ethylene polymer.

12. A thermoplastic blend composition as defined by claim 11, wherein the impact modifier comprises a carboxylated ethylene-propylene copolymer.

13. A thermoplastic blend composition as defined by claim 12, wherein the impact modifier comprises a maleic anhydride grafted ethylene-propylene copolymer.

14. A thermoplastic blend composition as defined by claim 11, wherein the impact modifier comprises a carboxylated ethylene-propylene-diene monomer terpolymer.

15. A thermoplastic blend composition as defined by claim 1, wherein the impact modifier comprises a methacrylate polymer grafted on an acrylate rubber substrate.

16. A thermoplastic blend composition as defined by claim 15, wherein the impact modifier comprises polymethylmethacrylate grafted on a butylacrylate rubber substrate.

17. A thermoplastic blend composition as defined by claim 1, wherein the impact modifier comprises a mixture of a vinyl aromatic-conjugated diene-vinyl aromatic triblock polymer and a copolymer of an alpha-olefin compound and an unsaturated carboxylic compound.

18. A thermoplastic blend composition as defined by claim 17, wherein the impact modifier comprises a mixture of a hydrogenated styrene-butadiene-styrene triblock polymer and a ethylene-acrylic acid copolymer.

19. A thermoplastic blend composition as defined by claim 1, wherein the impact modifier comprises a mixture of a hydrogenated styrene-butadiene-styrene triblock polymer and a carboxylated ethylene-propylene copolymer.

20. A thermoplastic blend composition as defined by claim 1, wherein the impact modifier comprises a mixture of a vinyl aromatic-conjugated diene-vinyl aromatic triblock polymer and a graft of an acrylate polymer on an acrylate rubber substrate.

* * * * *